United States Patent
Cui

(10) Patent No.: US 12,425,601 B2
(45) Date of Patent: Sep. 23, 2025

(54) METHOD AND APPARATUS FOR VIDEO PREDICTIVE CODING

(71) Applicant: BIGO TECHNOLOGY PTE. LTD., Singapore (SG)

(72) Inventor: Tongbing Cui, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 220 days.

(21) Appl. No.: 18/256,882

(22) PCT Filed: Dec. 3, 2021

(86) PCT No.: PCT/CN2021/135248
§ 371 (c)(1),
(2) Date: Jun. 9, 2023

(87) PCT Pub. No.: WO2022/121787
PCT Pub. Date: Jun. 16, 2022

(65) Prior Publication Data
US 2024/0031576 A1 Jan. 25, 2024

(30) Foreign Application Priority Data
Dec. 11, 2020 (CN) .......... 202011461361.8

(51) Int. Cl.
*H04N 19/136* (2014.01)
*H04N 19/159* (2014.01)
(Continued)

(52) U.S. Cl.
CPC ......... *H04N 19/136* (2014.11); *H04N 19/159* (2014.11); *H04N 19/176* (2014.11); *H04N 19/46* (2014.11)

(58) Field of Classification Search
CPC .. H04N 19/136; H04N 19/159; H04N 19/176; H04N 19/46
See application file for complete search history.

(56) References Cited

U.S. PATENT DOCUMENTS

2008/0008242 A1  1/2008  Lu et al.
2008/0069211 A1  3/2008  Kim et al.
(Continued)

FOREIGN PATENT DOCUMENTS

CN   101179728 A   5/2008
CN   105208387 A   12/2015
(Continued)

OTHER PUBLICATIONS

International Search Report of the International Searching Authority for State Intellectual Property Office of the People's Republic of China in PCT application No. PCT/CN2021/135248 issued on Feb. 23, 2022, which is an international application to which this application claims priority.
(Continued)

*Primary Examiner* — Kyle M Lotfi
(74) *Attorney, Agent, or Firm* — Kolitch Romano Dascenzo Gates LLC

(57) ABSTRACT

Provided is a method for video predictive coding. The method includes: determining, according to an executed mode, information of the executed mode in a decision making process of a best mode of a current prediction unit in inter-frame prediction, wherein the information of the executed mode includes a temporary best mode and a cost of the temporary best mode; and determining, based on the information of the executed mode, whether to skip an intra-frame prediction mode of the decision making process.

13 Claims, 2 Drawing Sheets

(51) Int. Cl.
  *H04N 19/176* (2014.01)
  *H04N 19/46* (2014.01)

(56) References Cited

U.S. PATENT DOCUMENTS

| | | |
|---|---|---|
| 2013/0266232 A1 | 10/2013 | Sato |
| 2016/0212421 A1 | 7/2016 | Muthu |
| 2017/0264914 A1* | 9/2017 | Agyo ............... H04N 19/176 |
| 2019/0028732 A1 | 1/2019 | Takano |
| 2019/0098316 A1* | 3/2019 | Vermeir ............ H04N 19/46 |
| 2020/0296387 A1 | 9/2020 | Mao |

FOREIGN PATENT DOCUMENTS

| | | |
|---|---|---|
| CN | 107396130 A | 11/2017 |
| CN | 110351552 A | 10/2019 |
| CN | 110896481 A | 3/2020 |
| CN | 112637591 A | 4/2021 |
| JP | 2008519503 A | 6/2008 |
| KR | 20160050115 A | 5/2016 |
| KR | 20160131337 A | 11/2016 |
| WO | 2012096229 A1 | 7/2012 |
| WO | 2015015436 A2 | 2/2015 |
| WO | 2016205154 A1 | 12/2016 |
| WO | 2017122604 A1 | 7/2017 |

OTHER PUBLICATIONS

Extended European Search Report Communication Pursuant to Rule 62 EPC for European Application No. 21902494.0 dated May 22, 2024, which is a foreign counterpart application to this application.

China National Intellectual Property Administration, Second Office Action in Chinese Patent Application No. 202011461361.8 issued on Jun. 15, 2024, which is a foreign counterpart application corresponding to this U.S. Patent Application, to which this application claims priority.

Notice of Reasons for Refusal of Japanese application No. 2023-535762 issued on Jul. 1, 2024.

Shimizu, Tomoyuki, et al., "A Study of Coding Mode Decision Method for H.264 Encoder", The Institute of Electronics, Information and Communication Engineers, Technical Report of IEICE, vol. 104 No.71, May 14, 2004, p. 17-p. 21.

Wang, Tingting, et al., "A fast intra-prediction decision algorithm in inter-frame based on a novel feature of HEVC", 2017 IEEE International Conference on Acoustics, Speech and Signal Processing(ICASSP), IEEE, Mar. 5, 2017, pp. 1532-1536, DOI: 10.1109/ICASSP.2017.7952413, figure 1.

Yang, Jungyoup, et al., "Early SKIP Detection for HEVC, and JCTVC-G JCTVC-G543", Nov. 10, 2011, p. 1-p. 3.

European Patent Office, Communication Pursuant to Rule 164(1) EPC, of European application No. 21902494.0 issued on Jan. 18, 2024, which is a foreign counterpart application to U.S. Patent Application.

China National Intellectual Property Administration, First office action of Chinese application No. CN202011461361.8 issued on Jan. 18, 2024, which is a foreign counterpart application corresponding to this U.S. Patent Application, to which this application claims priority.

Lin, Po-Han, et al.; "Restriction of fast intra-mode decision", 8th JVET Meeting, Macau, China, The Joint Video Exploration Team of ITU-T SG 16 WP 3 and ISO/IEC JRC 1/SC 29/WG 11, No. JVET-H0091, sections 1 and 2, Oct. 19, 2017.

Ding, Yuan-yuan et al.; "Research of fast intra prediction algorithm for H.264/AVC", Computer Engineering and Applications, 2008, 44(14): 1-4, May 11, 2008.

* cited by examiner

METHOD AND APPARATUS FOR VIDEO PREDICTIVE CODING

CROSS-REFERENCE TO RELATED APPLICATIONS

The present disclosure is a U.S. national stage of international application No. PCT/CN2021/135248, filed on Dec. 3, 2021, which is based on and claims priority to Chinese Patent Application No. 202011461361.8, filed on Dec. 11, 2020, the disclosures of which are herein incorporated by references in their entireties.

TECHNICAL FIELD

The present disclosure relates to video coding technologies, and for example, relates to a method and an apparatus for video predictive coding.

BACKGROUND OF THE INVENTION

High efficiency video coding (HEVC) is a latest-generation video coding standard, and doubles the compression efficiency compared to an advanced video coding compression standard H.264. HEVC adopts many complicated techniques to improve the compression efficiency. In one aspect, HEVC adopts a quad-tree partitioning method in which each block is referred to as a coding unit (CU) having a largest size of 64×64 and recursively partitioned into four coding sub-units, and the smallest CU has a size of 8×8, and thus, block segmentation of HEVC is more flexible with more block types over H.264. In another aspect, HEVC can attempt prediction modes for each CU, and each prediction mode corresponds to a prediction unit (PU). There are two types of prediction modes: inter-prediction modes (including Merge&Skip_2N×2N, Inter_2N×2N, Inter_2N×N, Inter_N×2N, Inter_2N×nU, Inter_2N×nD, Inter_nL×2N, Inter_nR×2N, Inter_N×N, and the like) and intra-prediction modes (including Intra_2N×2N and Intra_N×N). I-Frames only use the intra-prediction mode, and P-frames and B-frames use all the prediction modes. HEVC calculates a coding cost of each mode and selects a prediction mode with a minimum coding cost, such that a higher compression efficiency is achieved.

SUMMARY OF THE INVENTION

Embodiments of the present disclosure provide a method and an apparatus for video predictive coding.

The embodiments of the present disclosure provide a method for video predictive coding, including:
determining, according to an executed mode, information of the executed mode in a decision making process of a best mode of a current prediction unit in inter-frame prediction, wherein the information of the executed mode includes a temporary best mode and a cost of the temporary best mode; and
determining, based on the information of the executed mode, whether to skip an intra-frame prediction mode of the decision making process, wherein skipping the intra-frame prediction mode includes skipping partial processes of Intra and skipping whole processes of the intra-frame prediction mode.

The embodiments of the present disclosure further provide an electronic device for video predictive coding, including a memory, a processor, and a computer program stored on the memory and runnable on the processor, wherein the processor, when loading and running the program, is caused to perform the method described above.

The embodiments of the present disclosure further provide a non-volatile computer-readable storage medium storing a computer program stored thereon, wherein the computer program, when loaded and run by a processor, causes the processor to perform the method described above.

DETAILED DESCRIPTION

Figure 1:
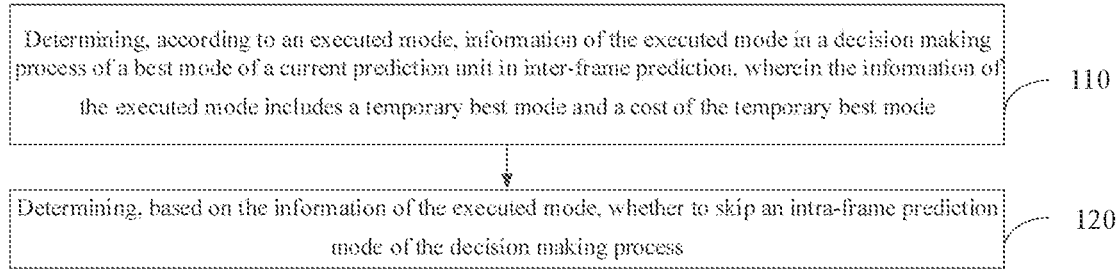
FIG. 1 is a flow chart of a method for video predictive coding according to some embodiments of the present disclosure.

The present disclosure will be further described in detail hereinafter with reference to the accompanying drawings and the embodiments. It can be understood that the specific embodiments described herein are merely used for explaining the present disclosure and are not intended to limit the present disclosure. In addition, it shall be noted that for convenience of description, only the portions associated with the present disclosure, rather than the entire structure, are shown in the drawings.

In HEVC, I-Frames only use the intra-prediction mode, and P-frames and B-frames use all the prediction modes. In the P-frames and B-frames of HEVC, the intra-prediction mode is also an important prediction mode. For a motion sequence, as a motion is accompanied with appearance of a new scenario and disappearance of an old scenario, matched blocks are not found in other frames for some coding units in each frame. For such coding units, a prediction effect of the intra-frame prediction can be obviously greater than a prediction effect of the inter-frame prediction. However, generally, matched blocks are found for most coding units in adjacent frames in a time domain, and thus proportions of selecting the intra-frame prediction in the P-frames and B-frames are low.

Compared with H.264, the intra-frame prediction mode of HEVC is greatly improved. HEVC supports 33 directional prediction modes and two non-directional prediction modes (planar and direct current (DC) modes) while H.264 only supports eight direction prediction modes. Therefore, a complexity of Intra of HEVC is greater than a complexity of H.264, and it is necessary to perform calculation of the rate-distortion cost (RD cost) on each prediction mode. Process calculation of the mode determination is COMPLEX, and is time-consumed. Therefore, if unnecessary rate-distortion optimization (RDO) mode selection is reduced, a resource cost of a coder is reduced to a great extent, such that a coding speed is improved, and a coding cost is reduced.

FIG. 1 is a flow chart of a method for video predictive coding according to some embodiments of the present disclosure. The embodiments are applicable to a predictive coding stage in video coding. Predictive coding indicates predicting a current sample value based on one or several coded sample values by a model or method, coding a difference value between a real value and a predicted value of a sample, and converting, quantifying, and entropy coding the predicted residual rather than the original pixel value, such that a coding efficiency is greatly improved. Predictive coding includes an intra-frame prediction (Intra) mode and an inter-frame prediction (Inter) mode. The I-frames only use the Intra mode, and the P-frames and B-frames use all the prediction modes.

In the P-frames and B-frames of HEVC, the Intra mode is also an important prediction mode. The Intra mode mainly indicates predicting a current pixel based on coded pixels and correlation of spatial pixels of a video, such that spatial redundancy of the video is removed. The intra-frame coding of a luminance component in HEVC includes five PUs: 4×4, 8×8, 16×16, 32×32, and 64×64, a PU with each size corresponds to 35 prediction modes: DC, Planar, and 33 angle modes, and a chrominance component has five prediction modes corresponding to: DC, Planar, horizontal, perpendicular, and a prediction mode corresponding to a luminance component. It is necessary to perform calculation of the RD cost on each prediction mode, and a process of calculation of such mode decision is complex, and is time-consumed. In the case that unnecessary rate-distortion optimization (RDO) mode selection is reduced through an intra-frame PU fast algorithm, a resource cost of a coder is reduced to a great extent, such that a coding speed is improved, and a coding cost is reduced.

On this basis, in the embodiments, the intra-frame mode is processed rapidly in inter-frame coding. A compression speed of the coder is improved by simplifying the decision complexity of intra-frame mode in inter-frame coding of the coder. After the compression speed of the coder is improved, a throughput rate of transcoding service is improved, such that a server resource is saved, and the transcoding cost is reduced.

It should be noted that the method in the embodiments is applicable to any hybrid coding architecture on the basis of blocks. The method is applicable to all coders in accordance with HEVC, and other coders in accordance with standards, such as AVS1, H.264, VP8, VP9, AVS2, AVS3, AV1, and VVC can directly use the method upon being adjusted. The coder in the embodiments is applicable to both the transcoding service and real-time coding service of a mobile terminal.

The embodiments include the following steps.

In S110, information of an executed mode is determined according to the executed mode in a decision making process of a best mode of a current prediction unit in inter-frame prediction, wherein the information of the executed mode includes a temporary best mode and a cost of the temporary best mode.

In S120, whether to skip an intra-frame prediction mode of the decision making process is determined based on the information of the executed mode.

Figure 2:
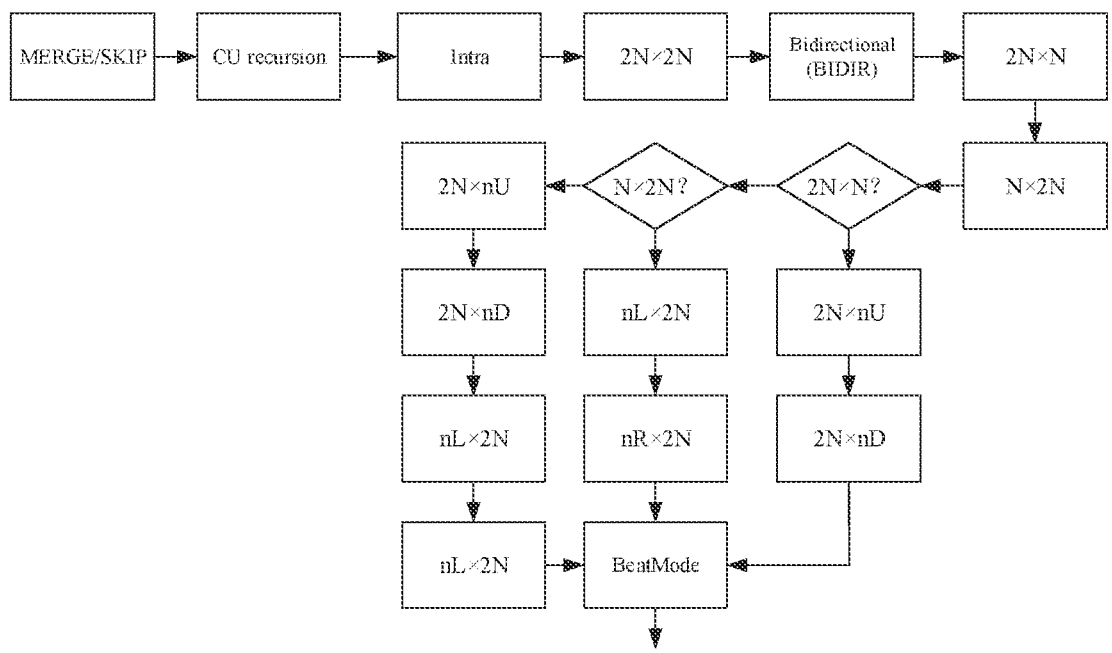
FIG. 2 is a schematic diagram of a decision making process of an inter-frame PU mode according to some embodiments of the present disclosure.

In some embodiments, a schematic diagram of a decision making process of an inter-frame PU mode is shown in FIG. 2. The decision making process of the inter-frame PU mode includes the following processes.

First, a 2N×2N merge/skip (MERGE/SKIP) mode is executed. A CU recursive mode is executed in the case that a recursive condition is satisfied, a CU with a size of a current block is returned after recursion is completed, and the intra-frame prediction (Intra) mode is continuously executed. After the Intra is completed, a 2N×2N inter-frame mode is executed (the best matched block is selected by searching forwards and backwards), and then 2N×2N bidirectional search (BIDIR) is executed (only the bidirectional search is performed to acquire the best matched block). 2N×N and N×2N mode types are continuously executed. Mode determination is performed once completion of one mode to acquire the temporary best mode (tempBestMode). N is a positive integer.

After N×2N is completed, in the case that tempBestMode=2N×N, 2N×nU and 2N×nD are continuously executed, and the final best mode BestMode is acquired upon comparison; in the case that tempBestMode=N×2N, nL×2N and nR×2N are continuously executed, and the final best mode (BestMode) is acquired upon comparison; and in the case that tempBestMode !=2N×N && tempBestMode !=N×2N, 2N×nU, 2N×nD, nL×2N, and nR×2N are continuously executed, and the final best mode (BestMode) is acquired upon comparison.

It should be noted that in the case that CU recursion is performed on the current block, a cost of the BestMode is compared with a recursive cost to determine whether to perform the CU recursive partitioning.

In addition, modes, such as 2N×N, N×2N, 2N×nU, 2N×nD, nL×2N, and nR×2N include two PUs, and each PU needs to be subjected to MERGE/SKIP, forward and backward search, and bidirectional search to acquire the best matched block.

In the embodiments, for the above decision making process, in the case that the best mode decision of the inter-frame prediction mode is executed on the current PU, corresponding information of the executed mode is acquired based on the executed mode, and whether to skip the intra-frame prediction (Intra) mode of the above decision making process is determined based on the information of the executed mode.

Exemplarily, the information of the executed mode includes the temporary best mode and the cost of the temporary best mode. In the embodiments, different manners are provided based on different information of the executed mode to determine whether to skip the Intra mode.

In an exemplary implementation scenario, skipping the Intra mode indicates skipping partial processes of Intra. That is, in executing the Intra mode, internal decision of Intra is intervened, such that Intra is not subjected to RDO to the greatest extent to reduce the complexity of the Intra mode and save the coding time. Decision of the intra-frame fast mode is directly executed based on the inter-frame coding PU information of the current PU to determine whether to skip the Intra mode without extra calculated amount, and thus a cost performance is high.

Figure 3:
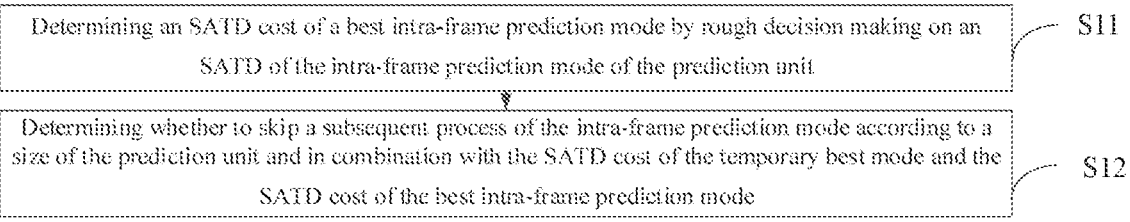
FIG. 3 is a flow chart of skipping of a decision making process of an Intra mode according to some embodiments of the present disclosure.

In some embodiments, the cost of the temporary best mode includes the SATD cost of the temporary best mode. As shown in FIG. 3, the S120 includes the following sub-steps.

In S11, an SATD cost of a best intra-frame prediction mode is determined by rough decision making on an SATD of the intra-frame prediction mode of the prediction unit.

In some embodiments, in executing the intra-frame prediction mode, a prediction mode with a lowest sum of absolute transformed difference (SATD) cost is selected, in combination with the SATD cost with a low complexity, from all the available intra-frame prediction modes and determined as the best intra-frame prediction mode.

In S12, whether to skip a subsequent process of the intra-frame prediction mode is determined according to a size of the prediction unit and in combination with the SATD cost of the temporary best mode and the SATD cost of the best intra-frame prediction mode.

In the process, after the SATD cost InterSATDCost of the temporary best mode and the SATD cost RModeSATDCost of the best intra-frame prediction mode are acquired, whether to skip the subsequent process of the Intra mode is determined according to PUs with different sizes.

The PUs with different sizes include 2N×2N PUs and N×N PUs. 2N×2N PUs indicate PUs with sub-blocks with sizes of 64×64, 32×32, 16×16, and 8×8, and N×N PUs indicate PUs with sub-blocks with the size of 4×4.

In some embodiments, in the case that the size of the current PU is N×N, S12 includes the following sub-steps.

In S121, whether a first prediction unit with a size of 4×4 adopts a transform skipping mode is determined.

In the embodiments, in the case that the size of the current PU is N×N, N×N is a particular Intra coding mode in which Intra coding is only performed on PUs capable of being continuously partitioned into four 4×4 in 8×8 partitioned PUs. For 4×4 PU coding, a particular coding mode is the transform skipping (TSKIP) mode.

The transform skipping mode is a technique introduced in HEVC, with a use range of intra-frame or inter-frame 4×4 blocks. It has an obvious effect on a video sequence slow in scenario change, such that the compression efficiency is improved. As the transform skipping modes of the four acquired 4×4 PUs are associated, the transform skipping modes of the first 4×4 PUs are determined in the embodiments, that is, whether the transform unit (TU) corresponding to a first 4×4 PU adopts decision of the transform skipping mode is determined, such that whether to skip the unexecuted subsequent process in the Intra mode is determined.

In S122, a mode cost threshold is determined based on a result of the determination and the SATD cost of the temporary best mode.

In some embodiments, in the case that the first 4×4 PU adopts the transform skipping mode, the mode cost threshold is determined as a product of the SATD cost of the temporary best mode and a first regulatory factor. In the case that the first 4×4 PU does not adopt the transform skipping mode, the mode cost threshold is determined as a product of the SATD cost of the temporary best mode and a second regulatory factor. The second regulatory factor is less than the first regulatory factor. That is, the mode cost threshold is determined according to the following equation:

$$SATDCostThreshold = firstTskip?InterSATDCost*a1:InterSATDCost*b1.$$

SATDCostThreshold represents the mode cost threshold, firstTskip? represents determination of whether the first 4×4 PU adopts the transform skipping mode (that is, whether the first 4×4 PU is the TSKIP block), InterSATDCost represents the STAD cost of the temporary best mode, a1 represents the first regulatory factor, and b1 represents the second regulatory factor.

In the case that firstTskip is 1, and the first 4×4 PU is the TSKIP block, SATDCostThreshold=InterSATDCost*a1. In the case that firstTskip is 0, and the first 4×4 PU is not the TSKIP block, SATDCostThreshold=InterSATDCost*b1.

It should be noted that as the TSKIP has a positive impact on the coding effect, in the case that the first 4×4 PU is the TSKIP, a probability that the subsequent blocks are TSKIP is high. Therefore, the mode cost threshold is improved to avoid skipping. Therefore, a1 is set to be greater than b1. The specific values of a1 and b1 are set according to actual demands. For example, a1 is 0.5, and b1 is 0.3.

In S123, the subsequent process of the intra-frame prediction mode is skipped in response to determining that the SATD cost of the best intra-frame prediction mode is greater than the mode cost threshold.

After the mode cost threshold is determined, the SATD cost of the best intra-frame prediction mode is compared with the mode cost threshold. In the case that the SATD cost of the best intra-frame prediction mode is greater than the mode cost threshold, the cost of the intra-frame coding is great. The Intra mode consumes the code rate, and thus the subsequent process of the Intra mode is skipped.

In some embodiments, a determination condition is further set in combination with the regulatory factors. Different accelerating demands are met by setting the regulatory factors. For example, whether to skip the subsequent process of the Intra mode is determined by the following conditions:

if(RModeSATDCost*c>d*SATDCostThreshold),
    skipIntra=true;

That is, in the case that RModeSATDCost*c is greater than d*SATDCostThreshold, the coding cost of executing the Intra mode is great, and thus the subsequent process of the Intra mode is skipped. c and d are regulatory factors, and are set according to the actual demands. For example, both c and d are 1.

In some embodiments, in the case that the size of the current PU is 2N×2N, whether to skip subsequent process of the Intra mode is determined in combination with the coding recursive condition. As shown in FIG. 2, in the case that the executed mode includes the CU recursive mode, the information of the executed mode further includes a ratio at which the coding sub-block corresponding to the current CU is the intra-frame prediction sub-block. The intra-frame prediction sub-block is the sub-block where the determined temporary best mode is the intra-frame prediction mode. For example, for four CU sub-blocks acquired by partitioning the current CU, in the case that a number of the sub-block (i.e., the Intra sub-block) that the predicted best mode is the Intra mode in the four CU sub-blocks is one, the ratio is 1/4. In the case that a number of the sub-block that the predicted best mode is the Intra mode in the four CU sub-blocks is two, the ratio is 2/4.

In some embodiments, in the case that the size of the current PU is 2N×2N, S12 includes the following sub-steps.

The subsequent process of the intra-frame prediction mode is skipped in response to determining that the SATD cost of the best intra-frame prediction mode is greater than the SATD cost of the temporary best mode and the ratio is less than a predetermined ratio threshold.

For example, whether to skip the subsequent process of the Intra mode is determined by the following equation:

if(RModeSATDCost*e>f*InterSATDCost &&
    Ra<g), skipIntra=true;

Ra represents the ratio at which the CU sub-block corresponding to the current CU is the Intra sub-block, and e, f, and g respectively represent regulatory factors and are set according to actual demands. For example, e, f, and g are respectively set as 1, 1, and 0.75.

For the above equation, in the case that RModeSATDCost*e>f*InterSATDCost, the cost of the intra-frame prediction coding is great. In the case that the Ra of the CU sub-block is less, for example, less than g, a probability that the best mode in the corresponding CU is the Intra mode is less. Therefore, the subsequent process of the Intra mode is directly skipped to terminate execution of the Intra mode in advance, such that the prediction time is saved, and the coding efficiency is improved.

In some embodiments, in the case that it is determined based on S11 and S12 that the subsequent process of the Intra mode is not skipped, the subsequent process of the Intra mode is continuously executed. For example, a candidate prediction mode roughly selected by SATD and a most possible mode (MPM) form a candidate prediction mode set. MPM is calculated based on the intra-frame prediction modes of adjacent PUs, and the adjacent PUs are respectively an upper block, a left block, and an upper left block. RDO is then performed on the candidate prediction mode set to acquire the best intra-frame prediction mode.

In another exemplary implementation scenario, skipping the Intra mode indicates skipping the entire process of Intra, and Intra is not executed directly to save the coding time. In the decision making process of the inter-frame best mode, whether to skip the Intra mode is determined based on information of the temporary best mode, and the temporary best mode is variable based on different contents, and features adaptive adjustment and high robustness.

Figure 4:
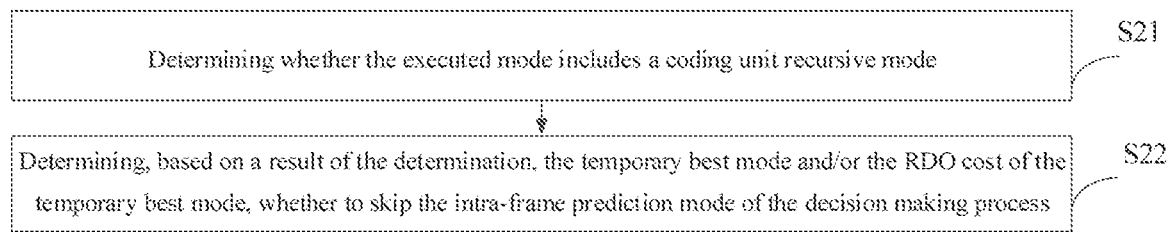
FIG. 4 is a flow chart of skipping of a decision making process of an Intra mode according to some embodiments of the present disclosure.

In some embodiments, the cost of the temporary best mode includes the RDO cost of the temporary best mode. As shown in FIG. 4, S120 includes the following sub-steps.

In S21, whether the executed mode includes the coding unit recursive mode is determined.

In S22, whether to skip the intra-frame prediction mode of the decision making process is determined based on a result of the determination, the temporary best mode and/or the RDO cost of the temporary best mode.

In some embodiments, in the case that the executed mode includes the CU recursive mode, the information of the executed mode further includes one or a combination of: a sum of RDO costs of coding sub-blocks corresponding to a current coding unit, first flag information indicating whether the current coding unit is an all-zero block, and second flag information indicating whether the coding sub-block corresponding to the current coding unit includes an intra-frame prediction sub-block. The intra-frame prediction sub-block is a sub-block where a predicted best mode is the intra-frame prediction mode. S22 includes the following step:

skipping the Intra mode of the decision making process in response to determining that one or a combination of the following conditions is met.

Condition 1: the sum of the RDO costs is greater than the RDO cost of the temporary best mode.

As the executed modes are modes performed with RDO, upon execution of the modes, corresponding RDO information (that is, the information of the executed mode) comes into being.

After the CU recursive mode is executed, the RDO cost of each CU sub-block is acquired, and the sum of the RDO costs of all the CU sub-blocks is calculated to acquire the sum of the RDO costs (that is, the recursive cost). In the case that the sum of the RDO costs is greater than the RDO cost of the temporary best mode, the recursive cost is greater than the temporary best cost, and thus CU recursive partitioning is not performed. Therefore, the code rate is saved. The Intra mode consumes the code rate, and thus the code rate is saved by skipping the Intra mode in the case that the sum of the RDO costs is greater than the RDO cost of the temporary best mode.

Condition 2: the first flag information indicates the current coding unit as the all-zero block.

In the condition, in the case that the first flag information indicates the current block as the all-zero block, as the code rate consumed by the all-zero block is low, the Intra mode consumes the code rate, the two are contradicted, and the probability that the best mode is the Intra mode at the all-zero block is low, the Intra mode is skipped in the case that the current block is the full-zero block.

Condition 3: the second flag information indicates that the coding sub-block corresponding to the current coding unit does not include the intra-frame prediction sub-block.

In the condition, in the case that the sub-block does not include the Intra sub-block (that is, the sub-block does not include the sub-block of which the predicted best mode is the Intra mode), the probability that the best mode of the current block is the Intra mode is low. Therefore, in the case that the sub-block does not include the Intra sub-block, the Intra mode is directly skipped.

In some embodiments, for improvement of the determining accuracy and reduction of the loss, the above three conditions are combined for determination. For example, the conditions 1 and 2 are combined. In the case that the conditions 1 and 2 are satisfied simultaneously, the Intra mode is skipped, as shown in the following condition determining equation:

$$\text{if } \left(a2 * \sum_{i=0}^{3} SubCuRdCost_i > b2 * BestModeRdCost \,\&\&\, ! BestMode \rightarrow CBF || ! splitIntra\right), skipIntra = true;$$

where $SubCuRdCos\,t_i$ represents the RDO cost of the CU sub-block, and $$\sum_{i=0}^{3} SubCuRdCost_i$$

represents the sum of the RDO costs of the sub-blocks, BestModeRdCost is the RDO cost of the temporary best mode, BestMode→CBF represents the first flag information used to indicate whether the coded current block is the full-zero block, splitIntra represents the second flag information used to indicate whether the sub-blocks include the Intra block, a2 and b2 are regulatory factors adjusted according to actual demands. For example, a2 and b2 are set as 1 by default.

In the above condition determining equation, in the case that $$a2 * \sum_{i=0}^{3} SubCuRdCost_i$$

>b2*BestModeRdCost and !BestMode→CBF are satisfied simultaneously, that is, the current block is the full-zero block, and the sum of the RDO costs is greater than the RDO cost of the temporary best mode, the Intra mode is skipped. Alternatively, in the case that the sub-blocks do not include the Intra block, the Intra mode is also skipped.

In some embodiments, in the case that the executed mode does not include the CU recursive mode, S22 includes the following sub-step.

In the case that the temporary best mode is the skipping (SKIP) mode, the intra-frame prediction mode is skipped.

In the embodiments, as the skipping (SKIP) mode saves the code rate, and the Intra mode consumes the code rate, for the saving of the code rate, the Intra mode is directly skipped in the case that the temporary best mode is determined as the skipping (SKIP) mode based on the executed mode.

In some embodiments, in the case that the Intra mode cannot be skipped through S21 and S22, the embodiments further include the following step.

a 2N×2N intra-frame SATD cost is acquired by performing 2N×2N intra-frame coding on the current coding unit, and an N×N intra-frame prediction mode is skipped in response to determining that the 2N×2N intra-frame SATD cost is greater than the SATD cost of the temporary best mode.

In the embodiments, in the case that the Intra mode cannot be skipped through S21 and S22, 2N×2N Intra coding is firstly performed on the current CU, and the 2N×2N Intra SATD cost is acquired. Then the 2N×2N IntraSATD cost is compared with the SATD cost of the temporary best mode to determine whether to skip the N×N Intra mode.

For example, whether to skip the N×N Intra mode is determined based on the following determining equation:

if($a3$*Intra2N×2NSATDCost>$b3$*BestModeSATDCost), skipIntraN×$N$=true;

Intra2N×2NSATDCost represents the 2N×2N Intra SATD cost, BestModeSATDCost represents the SATD cost of the temporary best mode, and a3 and b3 are regulatory factors and are set according to actual demands. For example, a3 and b3 are set as 10 and 11, respectively.

In the embodiments, the information of the executed mode is determined based on the executed mode in decision of the best mode of the current prediction unit in the inter-frame prediction. The information of the executed mode includes a temporary best mode and a cost of the temporary best mode. Then whether to skip the intra-frame prediction mode of the decision making process is determined based on the acquired information of the executed mode, such that the consumption of the Intra mode is reduced, the resource cost of the coder is reduced to a great extent, the coding speed is improved, and the coding cost is reduced. By determination of the skipping of the Intra mode in the embodiments, the coding speed is increased by 15% under the condition that the loss of the compression rate of the coder is 0.2%. Viewed from an online transcoding application, 15% of server calculation resource is saved under minor image quality loss, such that the transcoding cost is reduced.

Figure 5:
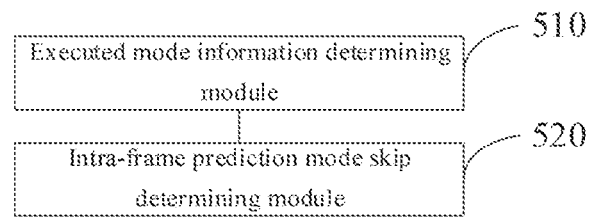
FIG. 5 is a structural block diagram of an apparatus for video predictive coding according to some embodiments of the present disclosure.

FIG. 5 is a structural block diagram of an apparatus for video predictive coding according to some embodiments of the present disclosure. The apparatus includes the following modules:

an executed mode information determining module 510, configured to determine, according to an executed mode, information of the executed mode in a decision making process of a best mode of a current prediction unit in inter-frame prediction, wherein the information of the executed mode comprises a temporary best mode and a cost of the temporary best mode; and an intra-frame prediction mode skip determining module 520, configured to determine, based on the information of the executed mode, whether to skip an intra-frame prediction mode of the decision making process.

In some embodiments, the cost of the temporary best mode includes the SATD cost of the temporary best mode. The intra-frame prediction mode skip determining module 520 includes the following sub-modules:

an SATD rough decision making sub-module, configured to determine an SATD cost of a best intra-frame prediction mode by rough decision making on an SATD of the intra-frame prediction mode of the prediction unit; and a first Intra mode skip determining sub-module, configured to determine whether to skip a subsequent process of the intra-frame prediction mode according to a size of the prediction unit and in combination with the SATD cost of the temporary best mode and the SATD cost of the best intra-frame prediction mode.

In some embodiments, the size of the prediction unit is N×N, and N is a positive integer. The first Intra mode skip determining sub-module is configured to:

determine whether a first prediction unit with a size of 4×4 adopts a transform skipping mode;

determine a mode cost threshold based on a result of the determination and the SATD cost of the temporary best mode; and skip the subsequent process of the intra-frame prediction mode in response to determining that the SATD cost of the best intra-frame prediction mode is greater than the mode cost threshold.

In some embodiments, the first Intra mode skip determining sub-module is configured to:

determine the mode cost threshold as a product of the SATD cost of the temporary best mode and a first regulatory factor in response to determining that the first prediction unit with the size of 4×4 adopts the transform skipping mode; and determine the mode cost threshold as a product of the SATD cost of the temporary best mode and a second regulatory factor in response to determining that the first prediction unit with the size of 4×4 does not adopt the transform skipping mode, wherein the second regulatory factor is less than the first regulatory factor.

In some embodiments, in the case that the size of the prediction unit is 2N×2N, the executed mode includes a coding unit recursive mode, and the information of the executed mode includes a ratio at which a coding sub-block corresponding to a current coding unit is an intra-frame prediction sub-block, wherein the intra-frame prediction sub-block is a sub-block where a predicted best mode is the intra-frame prediction mode; and the first Intra mode skip determining sub-module is configured to:

skip the subsequent process of the intra-frame prediction mode in response to determining that the SATD cost of the best intra-frame prediction mode is greater than the SATD cost of the temporary best mode and the ratio is less than a predetermined ratio threshold.

In some embodiments, the cost of the temporary best mode includes a RDO cost of the temporary best mode. The intra-frame prediction mode skip determining module 520 includes the following sub-modules:

a recursion determining sub-module, configured to determine whether the executed mode includes the coding unit recursive mode; and a second Intra mode skip determining sub-module, configured to determine, based on a result of the determination and at least one of the temporary best mode and the RDO cost of the temporary best mode, whether to skip the intra-frame prediction mode of the decision making process.

In some embodiments, in response to determining that the executed mode includes the coding unit recursive mode, the information of the executed mode further includes the following one or more pieces of information: a sum of RDO costs of coding sub-blocks corresponding to a current coding unit, first flag information indicating whether the current coding unit is an all-zero block, and second flag information indicating whether the coding sub-block corresponding to the current coding unit includes an intra-frame prediction sub-block, wherein the intra-frame prediction sub-block is a sub-block where a predicted best mode is the intra-frame prediction mode; and the second Intra mode skip determining sub-module is configured to:

skip the intra-frame prediction mode of the decision making process in response to determining that one or a combination of the following conditions is met:

the sum of the RDO costs being greater than the RDO cost of the temporary best mode, the first flag information indicating the current coding unit as the all-zero block, and the second flag information indicating that the coding sub-block corresponding to the current coding unit does not include the intra-frame prediction sub-block.

In some embodiments, in response to determining that the executed mode does not include the coding unit recursive mode, the second Intra mode skip determining sub-module is configured to:

skip the intra-frame prediction mode in response to determining that the temporary best mode is a skipping (SKIP) mode.

In some embodiments, the cost of the temporary best mode further includes an SATD cost of the temporary best mode. The apparatus further includes:

a 2N×2N intra-frame coding module, configured to acquire a 2N×2N intra-frame SATD cost by performing 2N×2N intra-frame coding on the current coding unit based on a result of the determination of not skipping the intra-frame prediction mode of the decision making process; and an N×N Intra mode skip determining module, configured to skip an N×N intra-frame prediction mode in response to determining that the 2N×2N intra-frame SATD cost is greater than the SATD cost of the temporary best mode.

It should be noted that the above apparatus for video predictive coding in the embodiments of the present disclosure performs the methods for video predictive coding in the embodiments of the present disclosure, and has the functional modules and beneficial effects corresponding to the executed methods.

Figure 6:
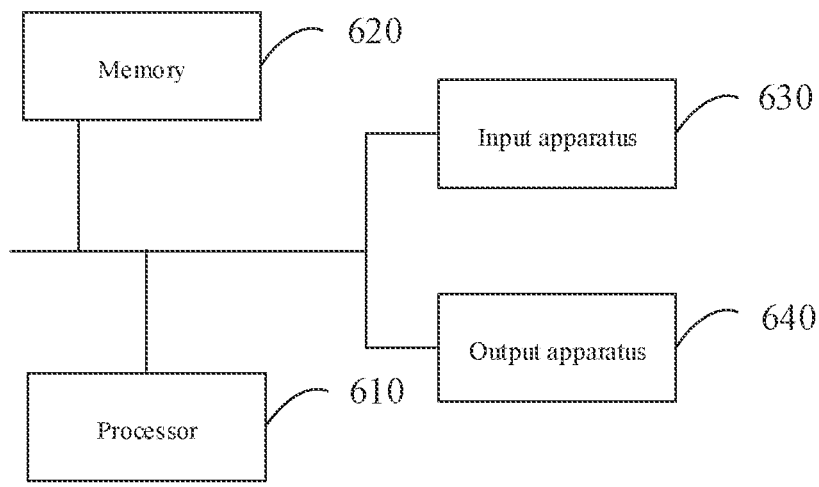
FIG. 6 is a schematic structural diagram of an electronic device according to some embodiments of the present disclosure.

FIG. 6 is a schematic structural diagram of an electronic device according to some embodiments of the present disclosure. As shown in FIG. 6, the electronic device includes a processor 610, a memory 620, an input apparatus 630, and an output apparatus 640. The number of the processors 610 in the electronic device is one or more, and FIG. 6 is illustrated by taking one processor 610 as an example. The processor 610, the memory 620, the input apparatus 630, and the output apparatus 640 in the electronic device are connected through a bus or by other ways, and FIG. 6 is illustrated by taking the bus as an example.

The memory 620, as a computer-readable storage medium, stores a software program, a computer executable program, and a module, for example, a program instruction/module corresponding to the methods in the embodiments of the present disclosure. The processor 610 performs various functional applications and data processing of the electronic device, that is, performs the above methods, by executing the software program, the instruction, and the module stored in the memory 620.

The memory 620 mainly includes a program storage region and a data storage region.

The program storage region stores an operating system and an application program required for at least one function; and the data storage region stores data established based on the use of a terminal. Furthermore, the memory 620 includes a high speed random access memory, and further includes a non-volatile memory, such as at least one magnetic disk memory, flash memory, or other non-volatile solid state memory. In some embodiments, the memory 620 includes memories arranged remotely relative to the processor 610, and the remote memories are connected to the electronic device over a network. Examples of the above network include, but are not limited to the Internet, an intranet, a local area network, a mobile communication network, and a combination thereof.

The input apparatus 630 receives input digital or character information, and generates key signal input associated with user settings and function control of the electronic device. The output device 640 includes a display device, such as a display screen.

Some embodiments of the present disclosure further provide a storage medium including a computer executable instruction. The computer executable instruction, when executed by a processor of a server, causes the processor to perform the method in any one of embodiments of the present disclosure.

Based on the above description of the embodiments, those skilled in the art may understand clearly that the present disclosure can be achieved either by software and necessary general-purpose hardware or by hardware. On the basis of such understanding, the technical solutions of the present disclosure in itself or the part making a contribution to the related art may be embodied in the form of a software product. The computer software product can be stored in the computer-readable storage medium, such as a floppy disk, a read-only memory (ROM), a random access memory (RAM), a flash memory (FLASH), a hard disk, or an optical disk of a computer, and includes several instructions, such that a computer device (a personal computer, a server, or a network device) performs the methods according to a plurality of the embodiments of the present disclosure. The computer-readable storage medium is a non-transitory computer-readable storage medium.

It should be noted that in the embodiments of the above apparatus, the plurality of units and modules are only partitioned based on functional logic, but are not limited to the above partitioning, as long as corresponding functions are achieved. In addition, specific names of multi-functional units are merely defined to distinguish, and are not intended to limit the protection scope of the present disclosure.

What is claimed is:

1. A method for video predictive coding, comprising:
determining, according to an executed mode, information of the executed mode in a decision making process of a best mode of a current prediction unit in inter-frame prediction, wherein the information of the executed mode comprises a temporary best mode and a cost of the temporary best mode, wherein the cost of the temporary best mode comprises a sum of absolute transformed difference (SATD) cost of the temporary best mode; and determining, based on the information of the executed mode, whether to skip an intra-frame prediction mode of the decision making process, wherein skipping the intra-frame prediction mode comprises skipping partial processes of Intra and skipping whole processes of the intra-frame prediction mode, wherein determining, based on the information of the executed mode, whether to skip the intra-frame prediction mode of the decision making process comprises:

determining an SATD cost of a best intra-frame prediction mode by rough decision making on an SATD of the intra-frame prediction mode of the prediction unit; and determining whether to skip a subsequent process of the intra-frame prediction mode according to a size of the prediction unit and in combination with the SATD cost of the temporary best mode and the SATD cost of the best intra-frame prediction mode;

in the case that the size of the prediction unit is N×N, determining whether to skip the subsequent process of the intra-frame prediction mode in combination with the SATD cost of the temporary best mode and the SATD cost of the best intra-frame prediction mode comprises:

determining whether a first prediction unit with a size of 4×4 adopts a transform skipping mode;

determining a mode cost threshold based on a result of the determination and the SATD cost of the temporary best mode; and skipping the subsequent process of the intra-frame prediction mode in response to determining that the SATD cost of the best intra-frame prediction mode is greater than the mode cost threshold; wherein N is a positive integer;

in the case that the size of the prediction unit is 2N×2N, the executed mode comprises a coding unit recursive mode, and the information of the executed mode comprises a ratio at which a coding sub-block corresponding to a current coding unit is an intra-frame prediction sub-block, wherein the intra-frame prediction sub-block is a sub-block where a predicted best mode is the intra-frame prediction mode; and determining whether to skip the subsequent process of the intra-frame prediction mode in combination with the SATD cost of the temporary best mode and the SATD cost of the best intra-frame prediction mode comprises:

skipping the subsequent process of the intra-frame prediction mode in response to determining that the SATD cost of the best intra-frame prediction mode is greater than the SATD cost of the temporary best mode and the ratio is less than a predetermined ratio threshold; wherein N is a positive integer.

2. The method according to claim 1, wherein determining the mode cost threshold based on the result of the determination and the SATD cost of the temporary best mode comprises:

determining the mode cost threshold as a product of the SATD cost of the temporary best mode and a first regulatory factor in response to determining that the first prediction unit with the size of 4×4 adopts the transform skipping mode; and determining the mode cost threshold as a product of the SATD cost of the temporary best mode and a second regulatory factor in response to determining that the first prediction unit with the size of 4×4 does not adopt the transform skipping mode, wherein the second regulatory factor is less than the first regulatory factor.

3. The method according to claim 1, wherein the cost of the temporary best mode comprises a rate-distortion optimization (RDO) cost of the temporary best mode; and determining, based on the information of the executed mode, whether to skip the intra-frame prediction mode of the decision making process comprises:

determining whether the executed mode comprises a coding unit recursive mode; and determining, based on a result of the determination and at least one of the temporary best mode and the RDO cost of the temporary best mode, whether to skip the intra-frame prediction mode of the decision making process.

4. The method according to claim 3, wherein in response to determining that the executed mode comprises the coding unit recursive mode, the information of the executed mode further comprises at least one of: a sum of RDO costs of coding sub-blocks corresponding to a current coding unit, first flag information indicating whether the current coding unit is an all-zero block, and second flag information indicating whether the coding sub-blocks corresponding to the current coding unit comprise an intra-frame prediction sub-block, wherein the intra-frame prediction sub-block is a sub-block where a predicted best mode is the intra-frame prediction mode; and determining, based on the result of the determination and at least one of the temporary best mode and the RDO cost of the temporary best mode, whether to skip the intra-frame prediction mode of the decision making process comprises:

skipping the intra-frame prediction mode of the decision making process in response to determining that at least one of the following conditions is met: the sum of the RDO costs being greater than the RDO cost of the temporary best mode, the first flag information indicating the current coding unit as the all-zero block, and the second flag information indicating that the coding sub-block corresponding to the current coding unit does not comprise the intra-frame prediction sub-block.

5. The method according to claim 3, wherein in response to determining that the executed mode does not comprise the coding unit recursive mode, determining, based on the result of the determination and at least one of the temporary best mode and the RDO cost of the temporary best mode, whether to skip the intra-frame prediction mode of the decision making process comprises:

skipping the intra-frame prediction mode in response to determining that the temporary best mode is a skipping (SKIP) mode.

6. The method according to claim 3, wherein the cost of the temporary best mode further comprises an SATD cost of the temporary best mode; and upon determining, based on the information of the executed mode, whether to skip the intra-frame prediction mode of the decision making process, the method further comprises:

acquiring a 2N×2N intra-frame SATD cost by performing 2N×2N intra-frame coding on the current coding unit based on a result of the determination of not skipping the intra-frame prediction mode of the decision making process; and skipping an N×N intra-frame prediction mode in response to determining that the 2N×2N intra-frame SATD cost is greater than the SATD cost of the temporary best mode.

7. An electronic device for video predictive coding, comprising a memory, a processor, and a computer program stored on the memory and runnable on the processor, wherein the processor, when loading and running the program, is caused to:
  determine, according to an executed mode, information of the executed mode in a decision making process of a best mode of a current prediction unit in inter-frame prediction, wherein the information of the executed mode comprises a temporary best mode and a cost of the temporary best mode; and
  determine, based on the information of the executed mode, whether to skip an intra-frame prediction mode of the decision making process, wherein skipping the intra-frame prediction mode comprises skipping partial processes of Intra and skipping whole processes of the intra-frame prediction mode;
  wherein the cost of the temporary best mode comprises a sum of absolute transformed difference (SATD) cost of the temporary best mode; and
  the processor, when loading and running the program, is caused to:
    determine an SATD cost of a best intra-frame prediction mode by rough decision making on an SATD of the intra-frame prediction mode of the prediction unit; and
    determine whether to skip a subsequent process of the intra-frame prediction mode according to a size of the prediction unit and in combination with the SATD cost of the temporary best mode and the SATD cost of the best intra-frame prediction mode;
  in the case that the size of the prediction unit is N×N, the processor, when loading and running the program, is caused to:
    determine whether a first prediction unit with a size of 4×4 adopts a transform skipping mode;
    determine a mode cost threshold based on a result of the determination and the SATD cost of the temporary best mode; and
    skip the subsequent process of the intra-frame prediction mode in response to determining that the SATD cost of the best intra-frame prediction mode is greater than the mode cost threshold; wherein N is a positive integer;
  in the case that the size of the prediction unit is 2N×2N, the executed mode comprises a coding unit recursive mode, and the information of the executed mode comprises a ratio at which a coding sub-block corresponding to a current coding unit is an intra-frame prediction sub-block, wherein the intra-frame prediction sub-block is a sub-block where a predicted best mode is the intra-frame prediction mode; and
  the processor, when loading and running the program, is caused to:
    skip the subsequent process of the intra-frame prediction mode in response to determining that the SATD cost of the best intra-frame prediction mode is greater than the SATD cost of the temporary best mode and the ratio is less than a predetermined ratio threshold; wherein N is a positive integer.

8. A non-volatile computer-readable storage medium, storing a computer program thereon, wherein the computer program, when loaded and run by a processor, causes the processor to:
  determine, according to an executed mode, information of the executed mode in a decision making process of a best mode of a current prediction unit in inter-frame prediction, wherein the information of the executed mode comprises a temporary best mode and a cost of the temporary best mode; and
  determine, based on the information of the executed mode, whether to skip an intra-frame prediction mode of the decision making process, wherein skipping the intra-frame prediction mode comprises skipping partial processes of Intra and skipping whole processes of the intra-frame prediction mode;
  wherein the cost of the temporary best mode comprises a sum of absolute transformed difference (SATD) cost of the temporary best mode; and
  the processor, when loading and running the program, is caused to:
    determine an SATD cost of a best intra-frame prediction mode by rough decision making on an SATD of the intra-frame prediction mode of the prediction unit; and
    determine whether to skip a subsequent process of the intra-frame prediction mode according to a size of the prediction unit and in combination with the SATD cost of the temporary best mode and the SATD cost of the best intra-frame prediction mode;
  in the case that the size of the prediction unit is N×N, the processor, when loading and running the program, is caused to:
    determine whether a first prediction unit with a size of 4×4 adopts a transform skipping mode;
    determine a mode cost threshold based on a result of the determination and the SATD cost of the temporary best mode; and
    skip the subsequent process of the intra-frame prediction mode in response to determining that the SATD cost of the best intra-frame prediction mode is greater than the mode cost threshold; wherein N is a positive integer;
  in the case that the size of the prediction unit is 2N×2N, the executed mode comprises a coding unit recursive mode, and the information of the executed mode comprises a ratio at which a coding sub-block corresponding to a current coding unit is an intra-frame prediction sub-block, wherein the intra-frame prediction sub-block is a sub-block where a predicted best mode is the intra-frame prediction mode; and
  the processor, when loading and running the program, is caused to:
    skip the subsequent process of the intra-frame prediction mode in response to determining that the SATD cost of the best intra-frame prediction mode is greater than the SATD cost of the temporary best mode and the ratio is less than a predetermined ratio threshold; wherein N is a positive integer.

9. The electronic device according to claim 7, wherein the processor, when loading and running, is caused to:
  determine the mode cost threshold as a product of the SATD cost of the temporary best mode and a first regulatory factor in response to determining that the first prediction unit with the size of 4×4 adopts the transform skipping mode; and determine the mode cost threshold as a product of the SATD cost of the temporary best mode and a second regulatory factor in response to determining that the first prediction unit with the size of 4×4 does not adopt the transform skipping mode, wherein the second regulatory factor is less than the first regulatory factor.

10. The electronic device according to claim 7, wherein the cost of the temporary best mode comprises a rate-distortion optimization (RDO) cost of the temporary best mode; and the processor, when loading and running the program, is caused to:

determine whether the executed mode comprises a coding unit recursive mode; and determine, based on a result of the determination and at least one of the temporary best mode and the RDO cost of the temporary best mode, whether to skip the intra-frame prediction mode of the decision making process.

11. The electronic device according to claim 10, wherein in response to determining that the executed mode comprises the coding unit recursive mode, the information of the executed mode further comprises at least one of: a sum of RDO costs of coding sub-blocks corresponding to a current coding unit, first flag information indicating whether the current coding unit is an all-zero block, and second flag information indicating whether the coding sub-blocks corresponding to the current coding unit comprise an intra-frame prediction sub-block, wherein the intra-frame prediction sub-block is a sub-block where a predicted best mode is the intra-frame prediction mode; and the processor, when loading and running the program, is caused to:

skip the intra-frame prediction mode of the decision making process in response to determining that at least one of the following conditions is met: the sum of the RDO costs being greater than the RDO cost of the temporary best mode, the first flag information indicating the current coding unit as the all-zero block, and the second flag information indicating that the coding sub-block corresponding to the current coding unit does not comprise the intra-frame prediction sub-block.

12. The electronic device according to claim 10, wherein in response to determining that the executed mode does not comprise the coding unit recursive mode, the processor, when loading and running the program, is caused to:

skip the intra-frame prediction mode in response to determining that the temporary best mode is a skipping (SKIP) mode.

13. The electronic device according to claim 10, wherein the cost of the temporary best mode further comprises an SATD cost of the temporary best mode; and the processor, when loading and running the program, is caused to:

acquire a 2N×2N intra-frame SATD cost by performing 2N×2N intra-frame coding on the current coding unit based on a result of the determination of not skipping the intra-frame prediction mode of the decision making process; and skip an N×N intra-frame prediction mode in response to determining that the 2N×2N intra-frame SATD cost is greater than the SATD cost of the temporary best mode.

* * * * *